(12) United States Patent
Ratnakaram et al.

(10) Patent No.: US 11,494,753 B2
(45) Date of Patent: Nov. 8, 2022

(54) CONTACTLESS EVENT PROCESSING

(71) Applicant: Bank of America Corporation, Charlotte, NC (US)

(72) Inventors: Udaya Kumar Raju Ratnakaram, Hyderabad (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 110 days.

(21) Appl. No.: 17/060,197

(22) Filed: Oct. 1, 2020

(65) Prior Publication Data

US 2022/0108296 A1 Apr. 7, 2022

(51) Int. Cl.
*G06Q 20/32* (2012.01)
*G06Q 20/40* (2012.01)
*G06Q 20/18* (2012.01)
*G06F 3/0482* (2013.01)

(52) U.S. Cl.
CPC ......... *G06Q 20/3221* (2013.01); *G06Q 20/18* (2013.01); *G06Q 20/3223* (2013.01); *G06Q 20/4014* (2013.01); *G06F 3/0482* (2013.01)

(58) Field of Classification Search
CPC ............... G06Q 20/3221; G06Q 20/18; G06Q 20/3223; G06Q 20/4014; G06F 3/0482
See application file for complete search history.

(56) References Cited

U.S. PATENT DOCUMENTS

| | | | |
|---|---|---|---|
| 7,819,329 B2 | 10/2010 | Lu et al. | |
| 8,694,793 B2 | 4/2014 | Evans | |
| 9,033,221 B1 * | 5/2015 | Ramachandran | G06Q 20/3274 235/375 |
| 9,401,077 B2 * | 7/2016 | Laracey | G06F 21/35 |
| 9,477,317 B1 * | 10/2016 | Clements | G06F 3/017 |
| 10,229,408 B2 | 3/2019 | Gardiner et al. | |
| 2009/0206165 A1 | 8/2009 | Laackmann et al. | |

(Continued)

FOREIGN PATENT DOCUMENTS

WO WO-2018076443 A1 * 5/2018 .............. H04W 4/80

OTHER PUBLICATIONS

"Guidelines for Contactless ATM Transactions—A Guide for ATM Owners and Operators." U.S. Payments Forum. Version 2.0. Jul. 2019. (Year: 2019).*

*Primary Examiner* — Elda G Milef
(74) *Attorney, Agent, or Firm* — Banner & Witcoff, Ltd.

(57) ABSTRACT

Systems for contactless event processing are provided. In some examples, functionality of a self-service kiosk may be requested. In response, a user may be authenticated and a first interactive user interface may be generated and displayed by the self-service kiosk. A user may capture an image of the generated first interactive user interface displayed by the self-service kiosk using, for instance, an image capture device of a user computing device. The captured image may be displayed by a display of the user computing device and the user may provide user input to the user computing device selecting a displayed option. The user input may be processed and mapped to functionality associated with the self-service kiosk. Based on the mapping, one or more instructions or commands may be generated and transmitted to the self-service kiosk. The self-service kiosk may execute the instructions or commands to execute the requested functionality.

18 Claims, 11 Drawing Sheets

(56) References Cited

U.S. PATENT DOCUMENTS

| | | |
|---|---|---|
| 2011/0173121 A1 | 7/2011 | Kawan |
| 2012/0187187 A1* | 7/2012 | Duff ................... G06Q 10/00 |
| | | 235/382 |
| 2012/0197798 A1* | 8/2012 | Grigg ................ G06Q 20/1085 |
| | | 705/43 |
| 2013/0124411 A1* | 5/2013 | Kobres ................ G06Q 40/02 |
| | | 235/379 |
| 2014/0062656 A1 | 3/2014 | Bowen et al. |
| 2021/0357897 A1* | 11/2021 | Phillips ................ G06F 21/31 |

* cited by examiner

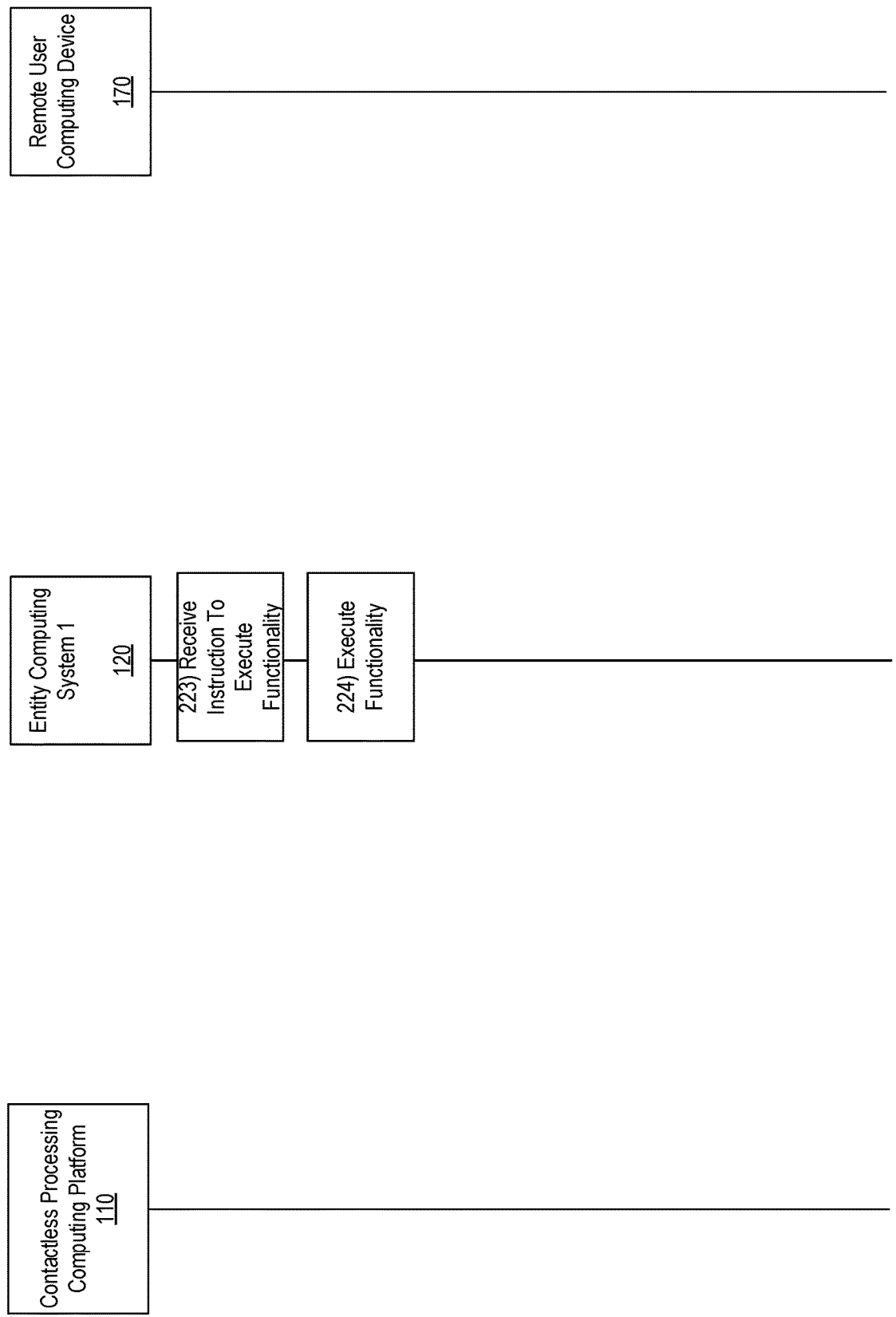

CONTACTLESS EVENT PROCESSING

BACKGROUND

Aspects of the disclosure relate to electrical computers, systems, and devices performing contactless transaction processing.

As customers become more aware of hygiene issues as they go about their daily routines, many customers want to avoid touching surfaces in public areas as much as possible. Accordingly, processing events while minimizing or eliminating contact with common surfaces is important. However, when dealing with self-service kiosks, such as an automated teller machine (ATM), automated transaction assistant (ATA), and the like, it may be difficult to request, execute, and/or process events without touching one or more surfaces, such as a common touchscreen, keypad, or the like. Arrangements discussed herein are directed to reducing or eliminating the need to contact one or more surfaces in requesting or processing an event at a self-service kiosk by relying on interactions with a user's personal computing device to facilitate event processing.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated executing functionality at a self-service kiosk while minimizing or eliminating user contact with the self-service kiosk.

In some examples, functionality of a self-service kiosk may be requested. In response, a user may be authenticated and a first interactive user interface may be generated and displayed by the self-service kiosk. In some examples, a user may capture an image of the generated first interactive user interface displayed by the self-service kiosk using, for instance, an image capture device of a user's personal computing device (e.g., smartphone, tablet, or the like). The captured image may be displayed by a display of the user's computing device and the user may provide user input (e.g., via a touch sensitive display of the user computing device) selecting a displayed option. The user input may be transmitted to, for instance, the self-service kiosk and/or a contactless processing computing platform, and mapped to functionality associated with the self-service kiosk. Based on the mapping, one or more instructions or commands may be generated and transmitted to the self-service kiosk. The self-service kiosk may execute the instructions or commands to execute the requested functionality.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing contactless event processing functions in accordance with one or more aspects described herein;

DETAILED DESCRIPTION

Figure 1A:
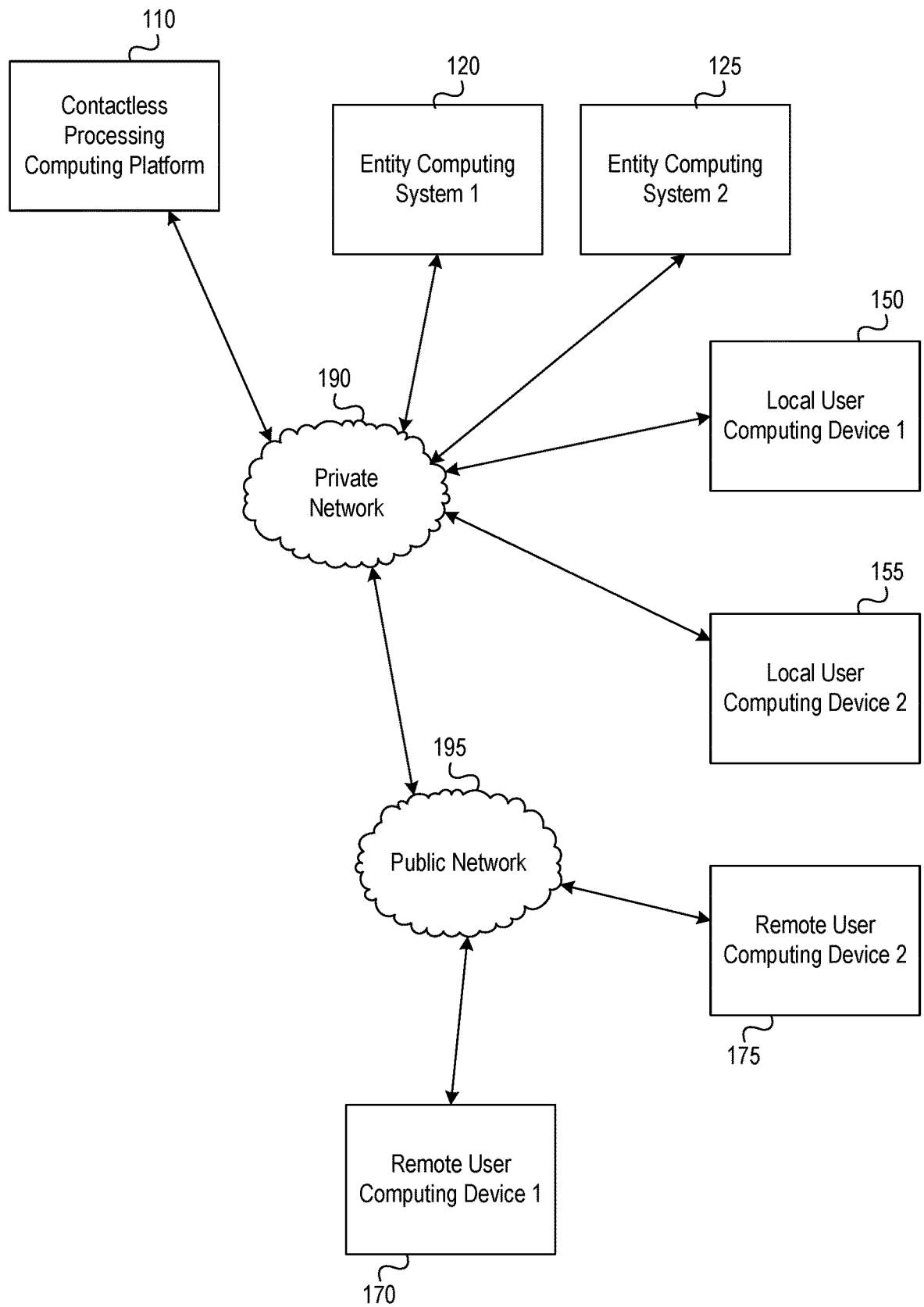
FIGS. 1A and 1B depict an illustrative computing environment for implementing contactless event processing functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, reducing or eliminating contact with common or public surfaces is an important consideration as people continue to focus on hygiene. However, when processing events at a self-service kiosk, such as an automated teller machine (ATM), automated teller assistant (ATA), or the like, it is often necessary, in conventional systems, to contact a touchscreen, keypad, or the like. Accordingly, arrangements described herein may reduce or eliminate the need to contact common surfaces on, for example, a self-service kiosk.

In some examples, a user may request functionality at a self-service kiosk. For instance, a user may wave his or her event processing device (such as a debit card, credit card, ATM card, or the like) near the self-service kiosk or a sensor therein such that the event processing device may be detected by the self-service kiosk. Based on detecting the event processing device, user data may be retrieved (e.g., from a database) and the user may be authenticated. In response to authenticating the user, a first interactive user interface may be displayed on a display of the self-service kiosk. The first user interface may include a plurality of selectable options, each option having a corresponding selection character.

In some examples, a user may capture an image of the displayed first interactive user interface displayed by the self-service kiosk. For instance, the user may employ an image capture device of a user computing device to capture an image of the displayed first interactive user interface. The captured image may be displayed by a display of the user computing device. The user may then select an option from the displayed image on the user computing device by touching or otherwise selecting a region associated with the desired option. Accordingly, the user does not have to contact the surfaces of the self-service kiosk and, instead, can contact his or her own personal computing device to request functionality of the self-service kiosk.

The user input may be transmitted to the self-service kiosk and/or a contactless processing computing platform and mapped to a functionality of the self-service kiosk. An instruction or command to execute the selected functionality may be generated and transmitted to the self-service kiosk for execution.

These and various other arrangements will be discussed more fully below.

Figure 1B:
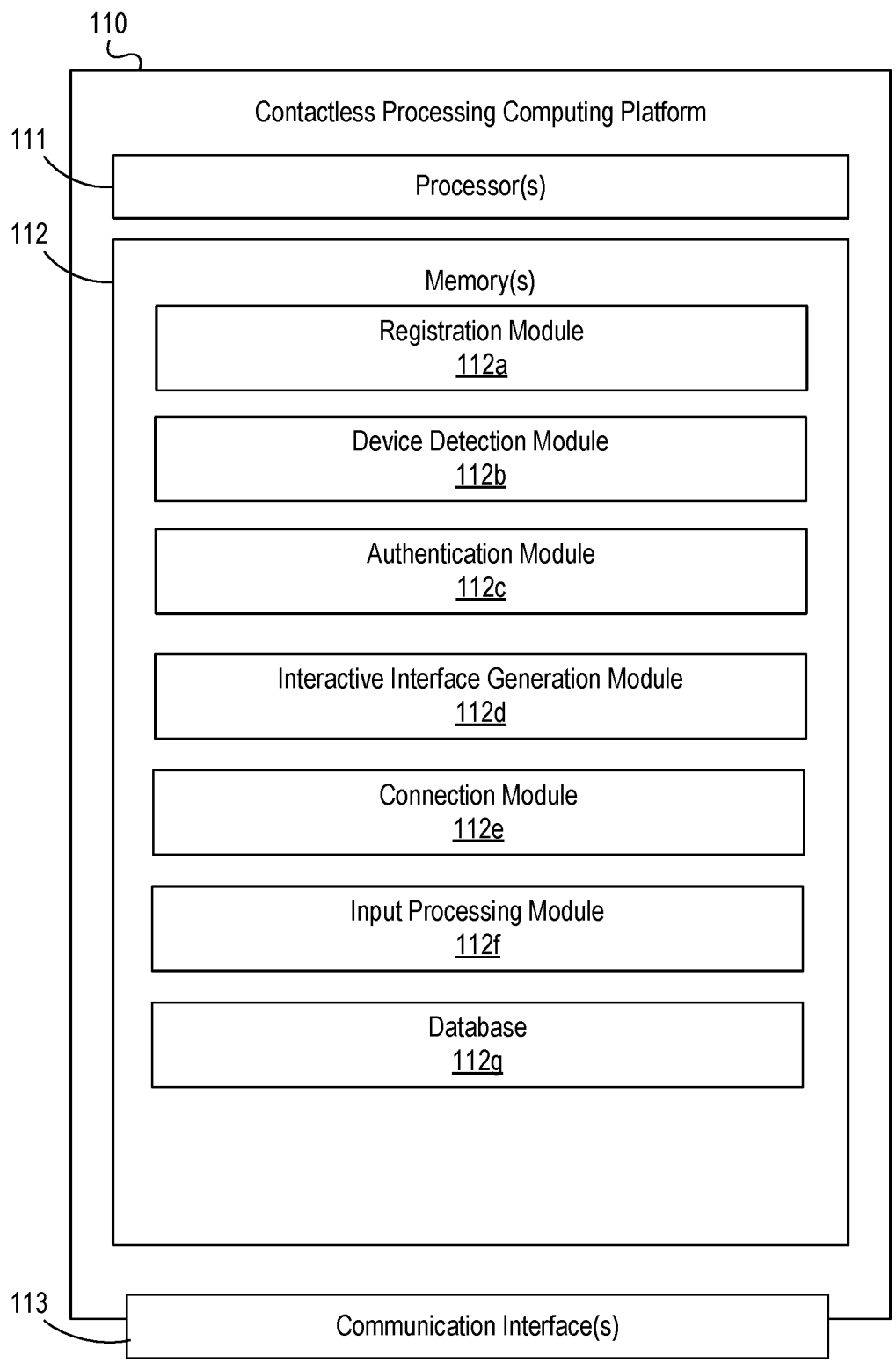

FIGS. 1A-1B depict an illustrative computing environment for implementing and using a system for contactless event processing in accordance with one or more aspects described herein. Referring to FIG. 1A, computing environment 100 may include one or more computing devices and/or other computing systems. For example, computing environment 100 may include contactless processing computing platform 110, entity computing system 1 120, entity computing system 2 125, a first local user computing device 150, a second local user computing device 155, a first remote user computing device 170, and a second remote user computing device 175. Although two entity computing systems 120, 125, two local user computing devices 150, 155, and two remote user computing device 170, 175 are shown, more or fewer devices may be used without departing from the invention.

Further, while FIG. 1A illustrates the devices schematically as being separate devices, one or more systems or devices may be in a same physical device and/or one or more devices may be connected to or otherwise in communication with other devices. For instance, entity computing system 1 120 and/or entity computing system 2 125 may be a self-service kiosk, such as an automated teller machine (ATM), automated teller assistant (ATA), or the like. The self-service kiosk may be configured to provide one or more financial or banking functions, customer service functions, or the like. In some examples, the contactless processing computing platform 110 may be a part of (e.g., a same physical device) one or more of the entity computing system 1 120 and/or entity computing system 2 125, or may be a separate device in communication with one or more of entity computing system 1 120, entity computing system 2 125, or various other computing devices, as will be discussed herein.

Contactless processing computing platform 110 may be configured to provide intelligent, dynamic, contactless event processing functions. For instance, contactless processing computing platform 110 may enable or provide (e.g., execute or cause to execute) one or more functions of a device, such as a self-service kiosk, while minimizing or eliminating a user's contact (e.g., physical contact via touching a screen or keypad) with the self-service kiosk. For instance, a user may approach a self-service kiosk and request functionality and/or authentication. For instance, in an example in which entity computing system 1 120 is a self-service kiosk, a user may approach the kiosk and may, in some examples, wave an event processing device, such as a debit card, credit card, ATM card, or the like, near the self-service kiosk. Based on near-field communication, Bluetooth™, or other signal detection technology, the self-service kiosk may detect the user and may activate and begin a process for providing functionality. Additionally or alternatively, the self-service kiosk may continuously or on a periodic basis scan for signals emitted from known devices, such as a pre-registered user device (e.g., smart phone, wearable device, tablet, event processing device, or the like) and may activate upon detecting a signal. Further, a user may insert or swipe his or her card through a card reader of the self-service kiosk in order to activate the self-service kiosk.

In some examples, authentication information may be requested from a user. In some examples, this may include transmitting a request for data to a pre-registered mobile device of the user (e.g., request for user input including password, personal identification number (PIN), or the like). Additionally or alternatively, the user may be authenticated based on detection of a signal emitted from a pre-registered user device. Further, the self-service kiosk may request user input including a PIN to the self-service kiosk. The authentication information may be evaluated by, for example, contactless processing computing platform 110 to determine whether the user is authenticated (e.g., whether data matches pre-stored data).

In some examples, responsive to receiving the request for functionality and/or responsive to authenticating the user, the contactless processing computing platform 110 may evaluate the event processing device and/or one or more accounts or user preferences associated therewith to determine whether contactless event processing has been requested. If so, the system may enable contactless event processing. In some examples, enabling contactless event processing may cause a wireless connection to be established between the self-service kiosk and a computing device of a user, such as a smartphone, tablet, or the like (e.g., remote user computing device 170, 175). In some examples, near-field communication, Bluetooth™, or the like, may be used to establish the connection.

In some arrangements, a user may capture an image of a user interface displayed by the self-service kiosk using, for instance, an image capture device of a user computing device (e.g., remote user computing device 170, remote user computing device 175, or the like). The user may then select one or more options from the options available via the user interface by touching a corresponding portion of the user computing device. A signal may be transmitted from the user computing device to the self-service kiosk which may then process the signal and execute the requested functionality. In examples in which a user is prompted with a series of user interfaces, the user may capture an image of each user interface and may make selections via the user computing device for each user interface which may then be executed by the self-service kiosk.

Additionally or alternatively, the user interface displayed on the self-service kiosk may be transmitted (e.g., via the wireless connection established) and displayed by a display of the user computing device to enable selections via the user computing device.

Entity computing system 1 120 and entity computing system 2 125 may be computing devices associated with the entity or enterprise organization implementing the contactless processing computing platform 110. As discussed above, one or more of entity computing system 1 120, entity computing system 2 125, or the like, may be or include a self-service kiosk providing various functions to a user. As also discussed above, one or more of entity computing system 1 120 and/or entity computing system 2 125 may include contactless processing computing platform 110.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the contactless processing computing platform 110, entity computing system 1 120, entity computing system 2 125, or the like to control parameters associated with the devices or systems, update or execute rules, modify settings and the like.

The remote user computing device 170 and remote user computing device 175 may be used to communicate with, for example, one or more systems, computing platforms, devices, or the like, to enable functionality associated with an entity computing system, authenticate a user, select functionality provided by the self-service kiosk, or the like. As discussed herein, remote user computing device 170 and/or remote user computing device 175 may be or include an event processing device, such as a credit card, debit card, or the like, a user computing device such as a smartphone, tablet, or the like, a wearable device, or the like. Accordingly, a user may rely on one remote user computing device 175 (e.g., an event processing device) to initiate functionality with the self-service kiosk, and another remote user computing device 170 (e.g., a smartphone) to capture and display user interfaces, select functionality options, and the like.

Computing environment 100 also may include one or more computing platforms. For example, and as noted above, computing environment 100 may include contactless processing computing platform 110. As illustrated in greater detail below, contactless processing computing platform 110 may include one or more computing devices configured to perform one or more of the functions described herein. For example, contactless processing computing platform 110 may include one or more computers (e.g., laptop computers, desktop computers, servers, server blades, or the like).

As mentioned above, computing environment 100 also may include one or more networks, which may interconnect one or more of contactless processing computing platform 110, entity computing system 1 120, entity computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, contactless processing computing platform 110, entity computing system 1 120, entity computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect contactless processing computing platform 110, entity computing system 1 120, entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., contactless processing computing platform 110, entity computing system 1 120, entity computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., contactless processing computing platform 110, entity computing system 1 120, entity computing system 2 125, local user computing device 150, local user computing device 155). In some examples, remote user computing device 170 may be, for example, an event processing or other device issued by the entity or enterprise organization operating the private network and may, in some examples, connect via either network 190 or network 195.

Referring to FIG. 1B, contactless processing computing platform 110 may include one or more processors 111, memory 112, and communication interface 113. A data bus may interconnect processor(s) 111, memory 112, and communication interface 113. Communication interface 113 may be a network interface configured to support communication between contactless processing computing platform 110 and one or more networks (e.g., private network 190, public network 195, or the like). Memory 112 may include one or more program modules having instructions that when executed by processor(s) 111 cause contactless processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of contactless processing computing platform 110 and/or by different computing devices that may form and/or otherwise make up contactless processing computing platform 110.

For example, memory 112 may have, store and/or include a registration module 112a. Registration module 112a may store instructions and/or data that may cause or enable the contactless processing computing platform 110 to receive data related to one or more users and/or user devices, accounts or the like. In some examples, registration module 112a may receive other registration data such as user options to enable contactless processing. In some arrangements, authentication data (e.g., biometric data, device data, username and password data, PIN, or the like) may be provided via the registration module 112a and pre-stored for later comparison to received authentication data. The registration module 112a may, upon receiving registration data, modify a database to store the registration data in a new entry. In some examples, registration module 112a may, with permission of the user, retrieve data related to the user from one or more other entity devices or systems (e.g., pre-stored account data, authentication data, or the like).

Contactless processing computing platform 110 may further have, store and/or include device detection module 112*b*. Device detection module 112*b* may detect a user computing device, such as remote user computing device 170, and enable or activate functionality of a self-service kiosk, such as entity computing system 1 120, in response to detecting the device. For instance, the entity computing system 1 120 may scan (e.g., continuously or on a periodic basis) and/or based on instructions from the contactless processing computing platform 110, for signals emitted from one or more devices. Upon detecting a signal, signal data may be transmitted to the contactless processing computing platform 110 device detection module 112*b* to evaluate the signal to determine whether it is associated with a pre-registered device, whether functionality should be activated or enabled, or the like. In some examples, device detection module 112*b* may detect a chip in an event processing device detected within proximity of the self-service kiosk using, for example, near-field communication, Bluetooth™, or the like. Additionally or alternatively, device detection module may detect a signal emitting from a mobile or other computing device of a user (e.g., smartphone, wearable device, tablet, or the like). In some examples, detection of a device may prompt contactless processing computing platform 110 to identify a user associated with the detected device and retrieve user data, such as authentication information, account information, and the like.

Contactless processing computing platform 110 may further have, store and/or include authentication module 112*c*. Authentication module 112*c* may store instructions and/or data that may cause or enable the contactless processing computing platform 110 to receive authentication data from a user, compare the authentication data to pre-stored data and authorize authentication of the user or deny authentication of the user, based on the comparing. For instance, authentication module 112*c* may receive a username and password combination, biometric data, PIN, indication of a detected signal from a device, and the like, and may compare the received data to pre-stored data. Based on the comparing, an authentication output or response may be generated and transmitted to, for instance, external computing system 1 120, causing external computing system 1 120 to enable functionality, activate functionality, or the like.

Contactless processing computing platform 110 may further have, store and/or include interactive interface generation module 112*d*. Interactive interface generation module 112*d* may store instructions and/or data that may cause or enable the contactless processing computing platform to generate one or more interactive user interfaces for display on, for example, a self-service kiosk such as entity computing system 1 120. As is discussed more fully herein, in some examples, an interactive user interface may be generated and displayed on a display of the self-service kiosk that includes a plurality of selectable options available to a user.

Contactless processing computing platform 110 may further have, store and/or include connection module 112*e*. Connection module 112*e* may store instructions and/or data that may cause or enable the contactless processing computing platform 110 to initiate or cause to initiate a connection, such as a wireless connection, between the self-service kiosk (e.g., entity computing system 1 120) and a user computing device (e.g., remote user computing device 170). In some examples, the connection may be initiated upon detecting the user computing device, detecting another pre-registered device associated with the user (e.g., an event processing device), or the like. In some arrangements, the connection may be initiated upon authenticating the user while, in other arrangements, the connection may be initiated prior to authentication and the user computing device may be used to provide authentication response data in order to authenticate the user. In some examples, initiating the connection between the self-service kiosk and the user computing device may cause execution of an application on the user computing device that may facilitate transmission of user input or user selections to the self-service kiosk to execute functionality of the self-service kiosk.

Contactless processing computing platform 110 may further have, store and/or include input processing module 112*f*. Input processing module 112*f* may store instructions and/or data that may cause or enable the contactless processing computing platform 110 to receive user input of a selectable option displayed on the user computing device from the user computing device, identify a functionality associated with the selectable option and generate and transmit a signal causing execution of the functionality associated with the selectable option by the self-service kiosk.

Contactless processing computing platform 110 may further have, store and/or include a database 112*g*. Database 112*g* may store data such as pre-stored authentication data, user data, user device data, or the like. The data stored in database 112*g* may be retrieved, for instance, for comparison to received authentication data to authenticate a user.

FIGS. 2A-2E depict one example illustrative event sequence for implementing and using contactless processing functions in accordance with one or more aspects described herein. The events shown in the illustrative event sequence are merely one example sequence and additional events may be added, or events may be omitted, without departing from the invention.

At step 201, registration data may be received. For instance, a user may transmit a request to register for contactless processing via, for instance, a user computing device (e.g., remote user computing device 175 not shown in FIG. 2A). The request to register may include registration information such as name of user, contact information of user, account information of user, device information of user, authentication information of the user, and the like. In some examples, the registration information may include one or more user preferences (e.g., customized events to use contactless processing, or the like). In some arrangements, the registration information may include user permission for contactless processing computing platform 110 to retrieve user information (e.g., account information, authentication information, or the like) from one or more other entity systems or databases. The request for registration data and associated request to register a user may be performed at a banking center, via an online application, via an application executing on a mobile device, or the like.

At step 202, responsive to receiving the registration data, a registration entry may be generated. For instance, a database may be modified to include an entry associated with the registration request. The entry may include a plurality of data elements associated with the user.

At step 203, a request to access functionality may be received by entity computing system 1 120. As discussed herein, entity computing system 1 120 may include a self-service kiosk, such as an ATM, ATA, or the like, that may be part of or separate from the contactless processing computing platform 110. In some examples, the request to access functionality may include detection of a user device by the entity computing system 1 120. For instance, entity computing system 1 120 may scan (e.g., continuously, on a periodic basis, or the like) for nearby signals (e.g., via near field communication, Bluetooth™, or the like) transmitted from one or more user devices, such as smartphones, wearable devices, and the like. In some examples, detection of a signal may constitute a request to access functionality. Additionally or alternatively, the detected signal may be compared to signals associated with pre-registered devices and, if a match occurs, the match may constitute the request to access functionality.

In some arrangements, a user may request access to functionality by moving in front of a motion sensor associated with entity computing system 1 120, by speaking a request that is captured via a microphone or other audio sensor associated with entity computing system 1 120, or the like.

Additionally or alternatively, a user may insert an event processing device (e.g., debit card, credit card, ATM card, or the like) into entity computing system 1 120 or may wave or pass the processing device near to a sensor or card or chip reader associated with entity computing system 1 120, which may constitute a request to access functionality.

At step 204, authentication data may be requested from the user. In some examples, requesting authentication data may include transmitting a request for user authentication data to a preregistered user device, such as a smartphone, wearable device, or the like (e.g., remote user computing device 170). The requested user authentication data may include PIN, biometric data or the like. Additionally or alternatively, the request for authentication data may include a request for user input into the self-service kiosk (e.g., entity computing system 1 120). Various other requests for authentication information may be used without departing from the invention.

For instance, in some examples, detection of a signal emitted from a pre-registered device may constitute authentication of a user. In these examples, step 204 requesting authentication data may be omitted.

At step 205, authentication data may be received by entity computing system 1 120. For instance, the authentication data may be input to the remote user computing device 170 and transmitted to the entity computing system 1 120. In some examples, the user may input the requested authentication data via the user computing device (remote user computing device 170). Additionally or alternatively, the user may input requested authentication data via the entity computing system 1 120. Further, detection of a signal emitted from a preregistered device may constitute authentication data.

Figure 2A:
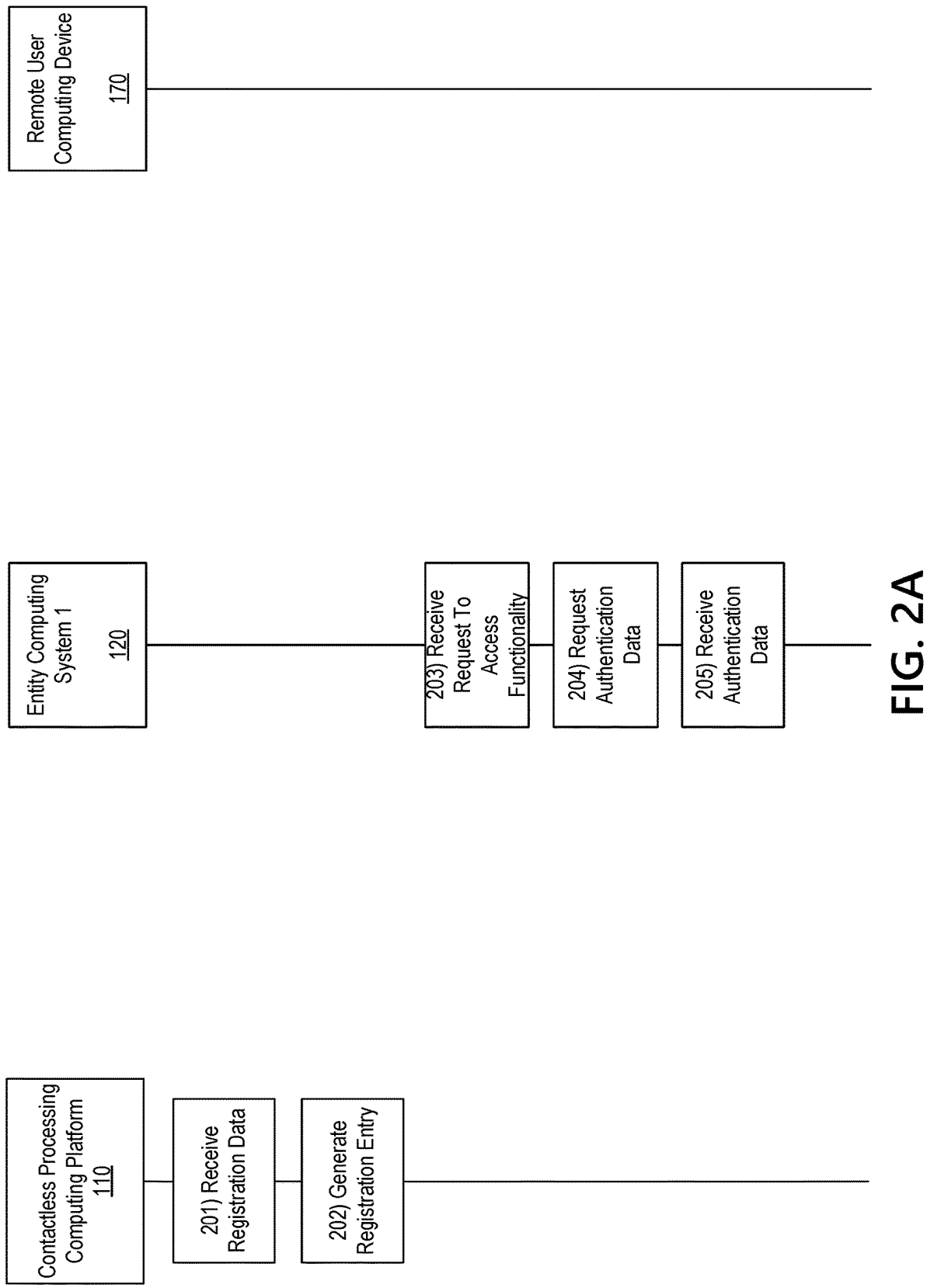
Figure 2B:
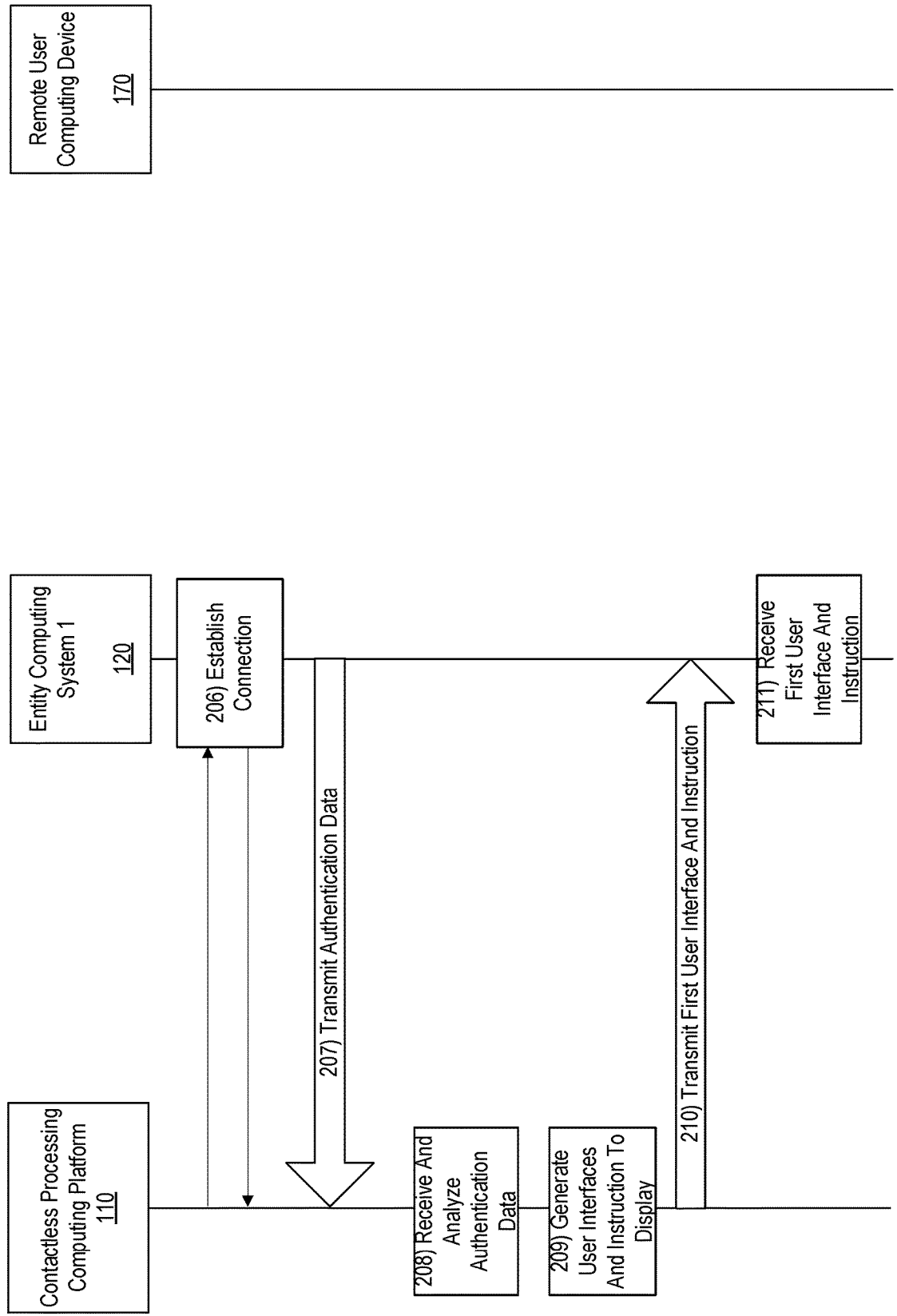

With reference to FIG. 2B, at step 206, a connection may be established between the entity computing system 1 120 and the contactless processing computing platform 110. For instance, a first wireless connection may be established between the contactless processing computing platform 110 and entity computing system 1 120. Upon establishing the first wireless connection, a communication session may be initiated between contactless processing computing platform 110 and entity computing system 1 120.

At step 207, the received authentication data may be transmitted from entity computing system 1 120 to contactless processing computing platform 110. For instance, the received authentication data may be transmitted during the communication session initiated upon establishing the first wireless connection.

At step 208, the authentication data may be received by contactless processing computing platform 110 and analyzed. For instance, pre-stored authentication data associated with a user may be retrieved from, for instance, database 112g, and compared to the received authentication data to determine whether a match exists. If so, the user may be authenticated and functionality of the entity computing system 1 120 may be enabled. If not, the request to access functionality may be denied and a notification may be transmitted for display (e.g., via a display of entity computing system 1 120, via remote user computing device 170, or the like).

At step 209, one or more user interfaces and associated instructions or commands for display may be generated. For instance, if a user is authenticated and functionality is enabled or activated for the user, one or more user interfaces may be generated. In some examples, a first user interface may include options for selection available to the user and associated with various functionality of the entity computing system 1 120. For instance, an interactive user interface including a plurality of selectable options, each associated with different functionality provided by entity computing system 1 120, may be generated. For instance, the first interactive user interface may include selectable options associated with functionality such as deposit, withdrawal, transfer, balance statement, more options, or the like. In some examples, additional user interfaces may be generated for display in response to selection of a selectable option from the first user interface. For instance, a second user interface providing options associated with different amounts available for withdrawal may be generated and displayed responsive to the entity computing system 1 120 receiving selection of an option for withdrawal. Various other additional user interfaces may be generated without departing from the invention.

At step 210, the generated first interactive user interface and associated instruction or command for display may be transmitted from contactless processing computing platform 110 to entity computing system 1 120. For instance, the generated first interactive user interface and associated instruction may be transmitted during the communication session initiated upon establishing the first wireless connection. In other examples, an additional wireless connection and associated communication session may be established and initiated.

At step 211, the first interactive user interface and associated instruction may be received by the entity computing system 1 120.

Figure 2C:
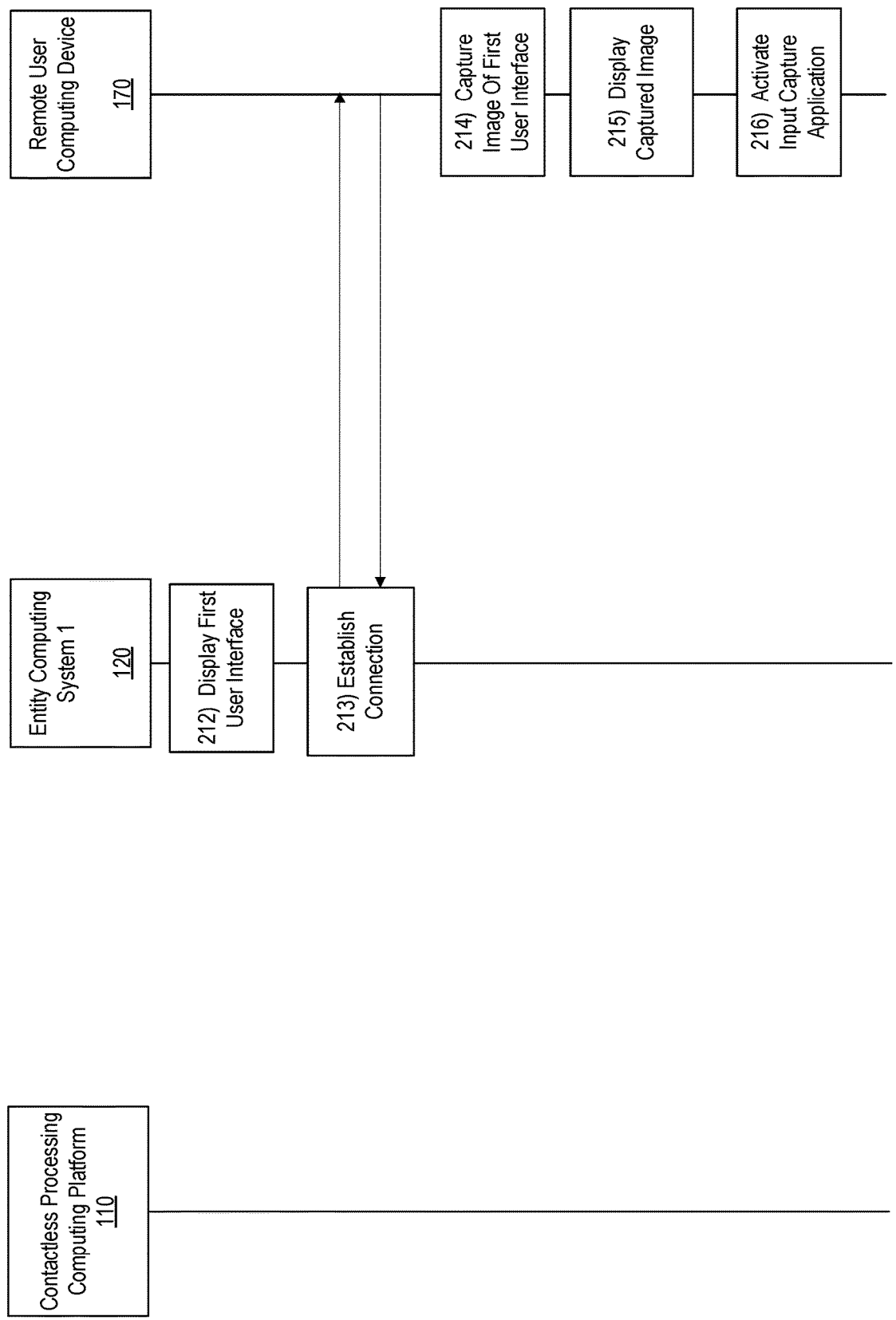

With reference to FIG. 2C, at step 212, the instruction or command to display the first interactive user interface may be executed and the first interactive user interface may be displayed or caused to be displayed on a display of entity computing system 1 120.

At step 213, a connection may be established between the entity computing system 1 120 and remote user computing device 170 (e.g., a mobile or other user computing device). For instance, a second wireless connection may be established between the entity computing system 1 120 and remote user computing device 170. Upon establishing the second wireless connection, a communication session may be initiated between contactless processing computing platform 110 and remote user computing device. In some examples, the second wireless connection may be initiated and established upon or in response to authenticating the user. Additionally or alternatively, the second wireless connection between the entity computing system 1 120 and the remote user computing device 170 may be established upon or responsive to receiving the request to access functionality of the entity computing system 1 120.

At step 214, an image of the displayed first interactive user interface may be captured via an image capture device of the remote user computing device 170. For instance, a user may activate an image capture application downloaded to or otherwise provided by the remote user computing device 170 and may capture an image of the displayed first interactive user interface displayed by the entity computing system 1 120.

At step 215, the captured image may be displayed by a display of the remote user computing device 170. For instance, the captured image may be displayed by a display of the user computing device. Display of the captured image may occur automatically and/or may be based on user input received by the remote user computing device 170.

At step 216, an input capture application may be activated or initiated. For instance, an input capture application operating or executing on the remote user computing device 170 may be activated or initiated. In some examples, the input capture application may be part of an application providing various other functionality, such as a mobile banking application, online banking application, or the like. The input capture application may enable a user to select functionality associated with the entity computing system 1 120 by selecting (e.g., via touchscreen or other user input device) a selectable option displayed by the display of the remote user computing device 170. That is, the input capture application may detect user input in a region of the display corresponding to a selectable option and may capture the user input as a selection.

Figure 2D:
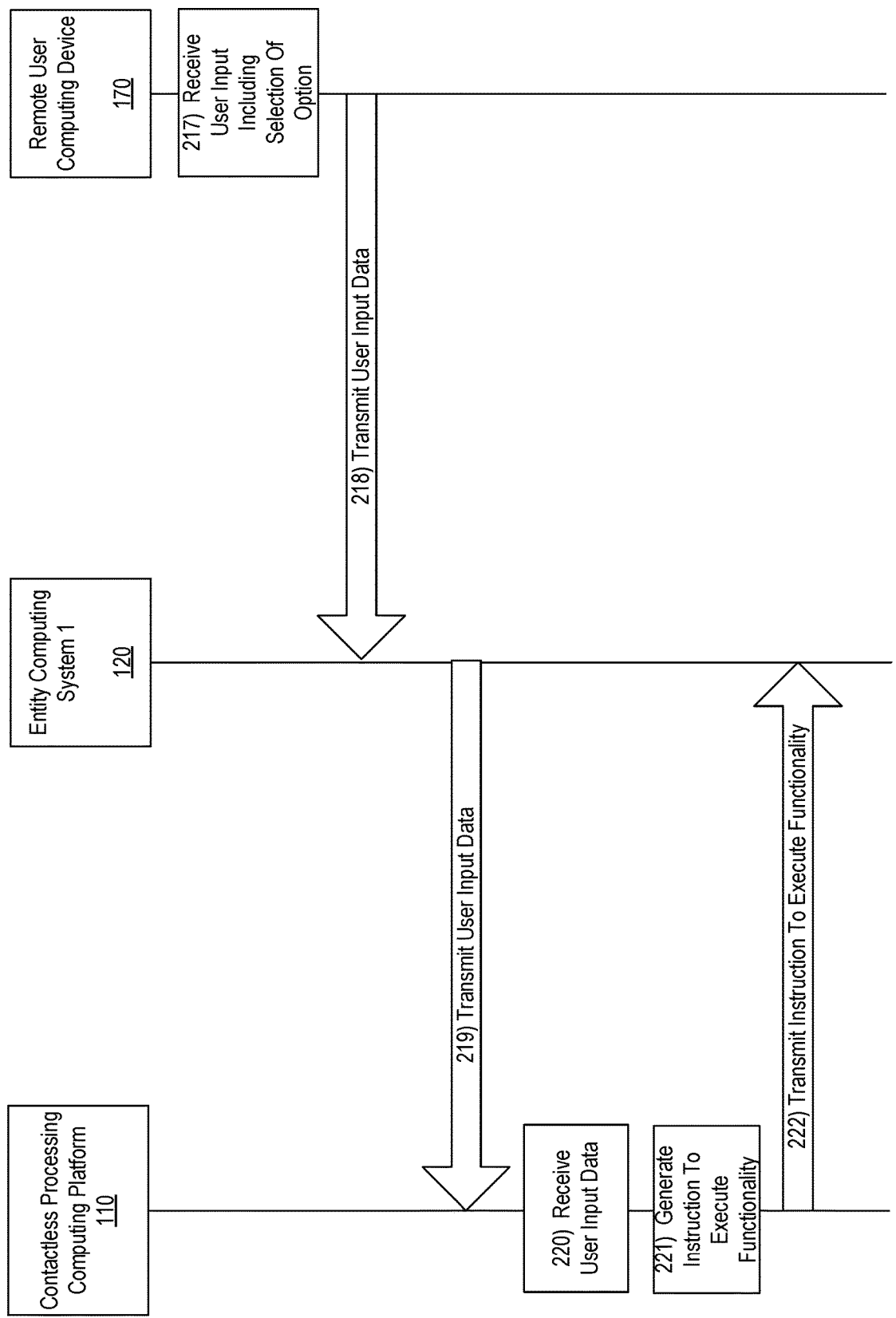

With reference to FIG. 2D, at step 217, the remote user computing device 170 may receive user input corresponding to one of the selectable options displayed via the captured image on the display of the remote user computing device 170. For instance, the remote user computing device 170 may receive touch input in a region of the touch sensitive display of the device 170. The user input may be captured and, at step 218, may be transmitted from the remote user computing device to the entity computing system 1 120 (e.g., via the second wireless connection).

At step 219, the user input data may be transmitted from the entity computing system 1 120 to the contactless processing computing platform 110 (e.g., in arrangements in which the entity computing system 1 120 is a separate device from the contactless processing computing platform 110). The user input data may be transmitted via the first wireless connection or another wireless connection may be established. In arrangements in which the contactless processing computing platform 110 is part of the entity computing system 1 120, step 219 may be omitted.

At step 220, the user input data may be received by contactless processing computing platform 110, analyzed and mapped to a functionality associated with the selected option and provided by the entity computing system 1 120.

At step 221, an instruction or command to execute functionality may be generated by the contactless processing computing platform 110. For instance, if the user input corresponds to a selectable option that would result in generation and display of a second user interface, the instruction or command generated may be to generate the second user interface. In another example, if the user input corresponds to a selectable option that would result in an operation of the entity computing system 1 120 (e.g., a withdrawal of X dollars), the instruction or command generated may cause the functionality to execute.

Accordingly, at step 222, the generated instruction (e.g., instruction to execute functionality, or the like) may be transmitted from the contactless processing computing platform 110 to the entity computing system 1 120. In some examples, the generated instruction or command may be transmitted during the communication session initiated upon establishing the first wireless connection. Additionally or alternatively, other wireless connections may be established and communication sessions initiated.

With reference to FIG. 2E, at step 223, the instruction or command to execute functionality may be received by entity computing system 1 120 and, at step 224, the instruction or command may be executed causing execution of the selected functionality by the entity computing system 1 120 (e.g., dispensing funds by the self-service kiosk, providing requested information, enabling deposits, and the like).

Figure 3:
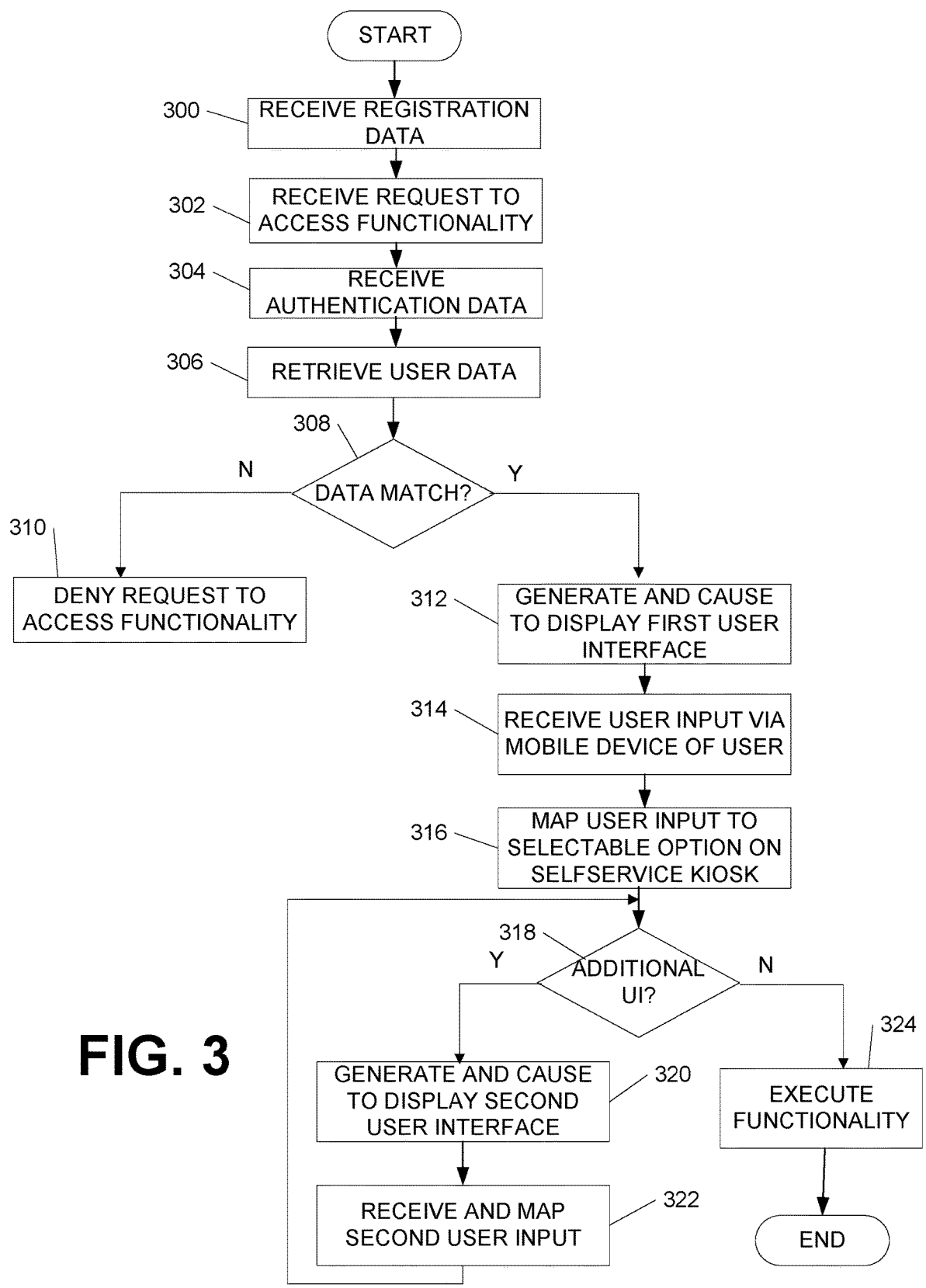
FIG. 3 depicts an illustrative method for implementing and using contactless event processing functions according to one or more aspects described herein.

FIG. 3 is a flow chart illustrating one example method of implementing contactless processing functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, registration data may be received from a user. For instance, a user may request to register for contactless transaction or event processing. In some examples, the registration information may include user identifying information (e.g., name, contact information, username, password, personal identification number (PIN), or the like), as well as data associated with an event processing device of the user, such as account number, unique identifier, or the like. Registration data may also include user preferences, such as when and if to enable contactless processing. A user may request registration upon opening an account or after an account has been opened. In some examples, a user may request registration at a banking center, via a mobile banking application executing on a user computing device, via an online banking application, or the like.

At step 302, a request to access functionality of entity computing system 1 120, such as a self-service kiosk, may be received. For instance, a user may wave his or her event processing device, such as a debit card, credit card, or the like, near a sensor arranged on a self-service kiosk (e.g., entity computing system 170) to request access to functionality of the self-service kiosk. Additionally or alternatively, a user may swipe his or her event processing device through a card reader to request access or functionality. Further, a signal emitted from the event processing device, or other user computing device (e.g., remote user computing device 170) may be detected and may constitute a request to access functionality.

At step 304, authentication data may be received from the user requesting access to functionality of the entity computing system 1 120. For instance, authentication data such as username and password, PIN, biometric data, detection of a signal associated with a pre-registered device, or the like, may be received.

At step 306, user data may be retrieved from one or more databases. For instance, pre-stored user data may be retrieved. In some examples, the pre-stored user data may be retrieved by querying a database using data captured from, for instance, the request to access functionality, as inputs. For example, user or device identifying information may be retrieved from the event processing device, user computing device (e.g., remote user computing device 170), or the like, and used to query a database to retrieve pre-stored data associated with the user, such as authentication data.

At step 308, the received authentication data may be compared to the retrieved, pre-stored authentication data to determine whether the data matches. If, at step 308, a match does not exist, a notification denying the request to access functionality may be generated and transmitted to a user device at step 310.

If, at step 308, a match does exist, contactless processing may be enabled at step 312 (e.g., based on user preferences in retrieved data) and a first interactive user interface may be generated and caused to display on the entity computing system 1 120.

At step 314, user input may be received via the mobile device of the user (e.g., remote user computing device 170). For instance, a user may capture an image of the displayed first interactive user interface displayed on the entity computing system 1 120 using an image capture device of the remote user computing device 170. The user may then provide user input by, for example, touching a region of the touch sensitive display of the remote user computing device 170 corresponding to a selectable option being selected by the user. The remote user computing device 170 may transmit the user input to the contactless processing computing platform 110 (in some examples, via the entity computing system 1 120) and it may be received at step 314.

At step 316, the user input may be mapped to a functionality associated with the entity computing system 1 120 (e.g., self-service kiosk).

At step 318, a determination may be made as to whether the selected option (e.g., the mapped user input) corresponds to a function requiring generation and display of additional user interfaces. If so, the contactless processing computing platform 110 may generate one or more additional user interfaces, and may transmit the additional user interfaces to the entity computing system 1 120 for display at step 320. The user may capture images of the additional user interfaces and provide user input via the remote user computing device. The second user input may be received by the contactless processing computing platform 110 at step 322, and mapped to the corresponding functionality. The process may then return to step 318 to determine whether the selected option corresponds to another function requiring generation and display of additional user interfaces.

If, at step 318, the selected option does not correspond to a function requiring additional user interfaces, an instruction to command to execute the selected functionality may be generated, transmitted to entity computing system 1 120, and executed by entity computing system 1 120 to provide the requested functionality to the user.

Figure 4A:
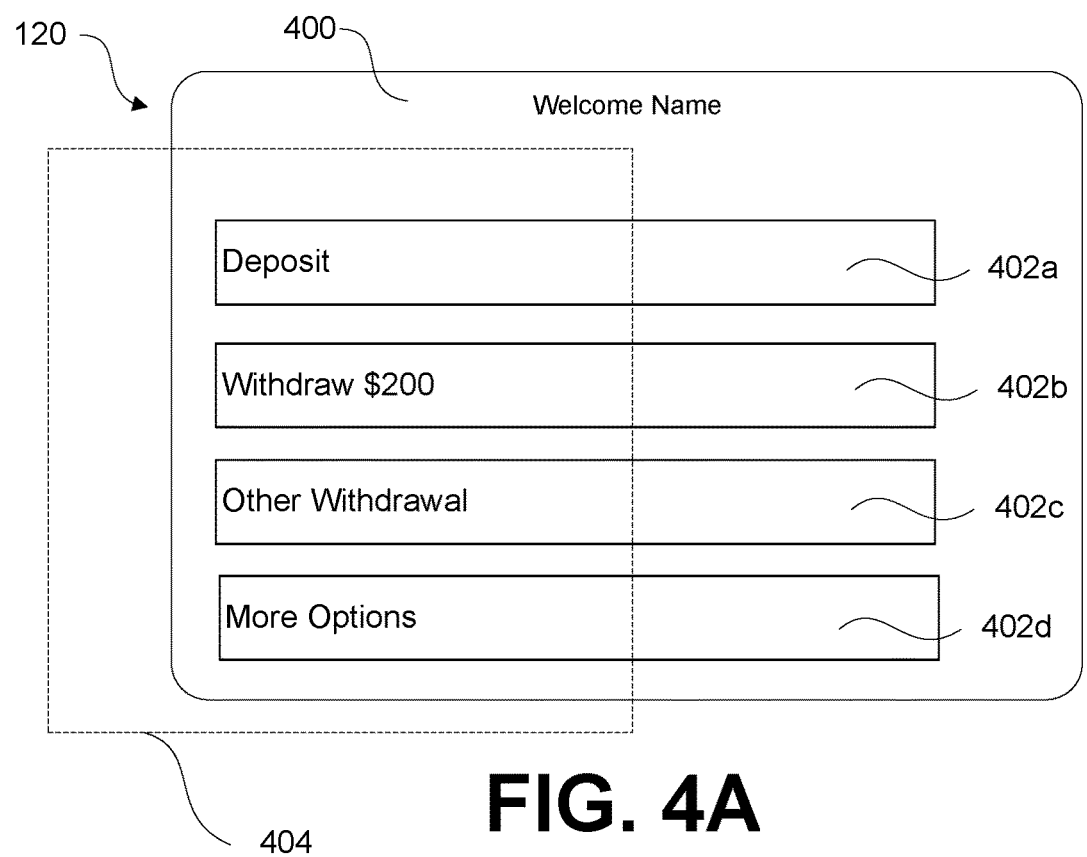
FIGS. 4A and 4B illustrate example interactive user interfaces that may be generated and/or captured and displayed in accordance with one or more aspects described herein.
Figure 4B:
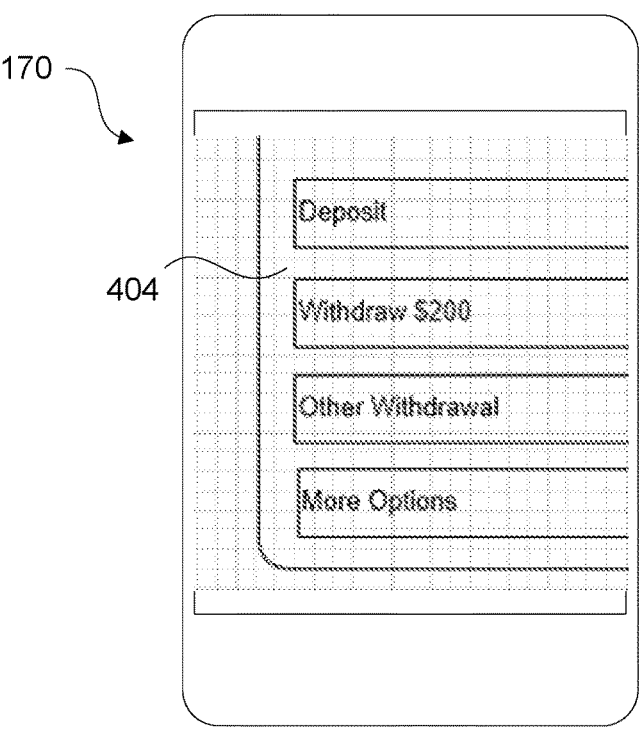

FIGS. 4A and 4B illustrate example user interfaces displayed by the entity computing system 1 120 (e.g., self-service kiosk) and remote user computing device 170 (e.g., mobile or other user computing device), respectively. As shown in FIG. 4A, entity computing system 1 120 (such as self-service kiosk) may include a display displaying generated interactive user interface 400. Interactive user interface 400 may include a plurality of selectable options 402a-402d. In some examples, a selectable option may prompt generation and display of additional interactive user interfaces (e.g., selection of "more options" 402d may cause generation and display of another interactive user interface providing additional options) while other selectable options may cause execution of functionality by the entity computing system 1 120 (e.g., selection of "withdraw $200" 402b may cause the entity computing system 1 120 to dispense $200).

As discussed herein, a user may capture an image of the interactive user interface 400 via an image capture device of remote user computing device 170. For instance, a user may capture an image of the selectable options displayed by the entity computing system 1 120 as shown by element 404.

With reference to FIG. 4B, the image captured in 404 may be displayed by a display of remote user computing device 170. The user may then select (e.g., via touchscreen of the remote user computing device 170) an option for selection. The selected option may be captured and transmitted to contactless processing computing platform 110 for processing and generation of instructions or commands to execute the functionality associated with the selected option. Accordingly, the user may select functionality associated with a self-service kiosk with minimal or no contact with the self-service kiosk itself.

As discussed herein, the contactless event processing arrangements may reduce or eliminate user contact with common surfaces, such as surfaces associated with a self-service kiosk. In addition, arrangements discussed herein may reduce occurrences of unauthorized activity. For example, unauthorized actors have been known to install a proxy keypad on self-service kiosk, which may then be used to facilitate unauthorized activity. By capturing an image of the interactive user interface of the self-service kiosk and making selections from a user's personal computing device, the user may bypass inputting selections via the self-service kiosk itself, thereby rendering the proxy keypad useless.

In some examples, contactless processing may be initiated upon detection of the user (e.g, prior to authentication) such that a user may provide authentication information via a user interface displayed on the user computing device. For instance, in some examples, a first user interface displayed on the self-service kiosk may include a request for authentication data, such as a PIN. The user may capture an image of the first user interface and may provide authentication response data (e.g., his or her PIN) via a keypad or touchscreen associated with the user computing device, rather than the keypad of the self-service kiosk. The user authentication response data may be transmitted to the contactless processing computing platform 110 for comparison to pre-stored data and authentication of the user, which may then prompt display of a second interactive user interface. Accordingly, upon detecting a user or receiving a request to access functionality, a connection may be established between the self-service kiosk (e.g., entity computing system 1 120) and the user computing device (e.g., remote user computing device 170).

Although various arrangements described herein are directed to displaying a captured image of a user interface, in some examples, a user interface displayed by a self-service kiosk may be replicated (e.g., by an application executing on the remote user computing device 170) for display by a display of the remote user computing device 170. Accordingly, the user may provide user input (e.g., via touchscreen or keypad on the remote user computing device 170) to make one or more selections of options displayed.

As discussed, aspects described herein are directed to reducing or eliminating contact with one or more common surfaces, such as a screen or keypad at a self-service kiosk. By enabling a user to may make selections related to functionality of the self-service kiosk by selecting options from the mobile device of the user, rather than by selecting options (e.g., touching) via the self-service kiosk itself, contact with the self-service kiosk may be minimized or eliminated.

Figure 5:
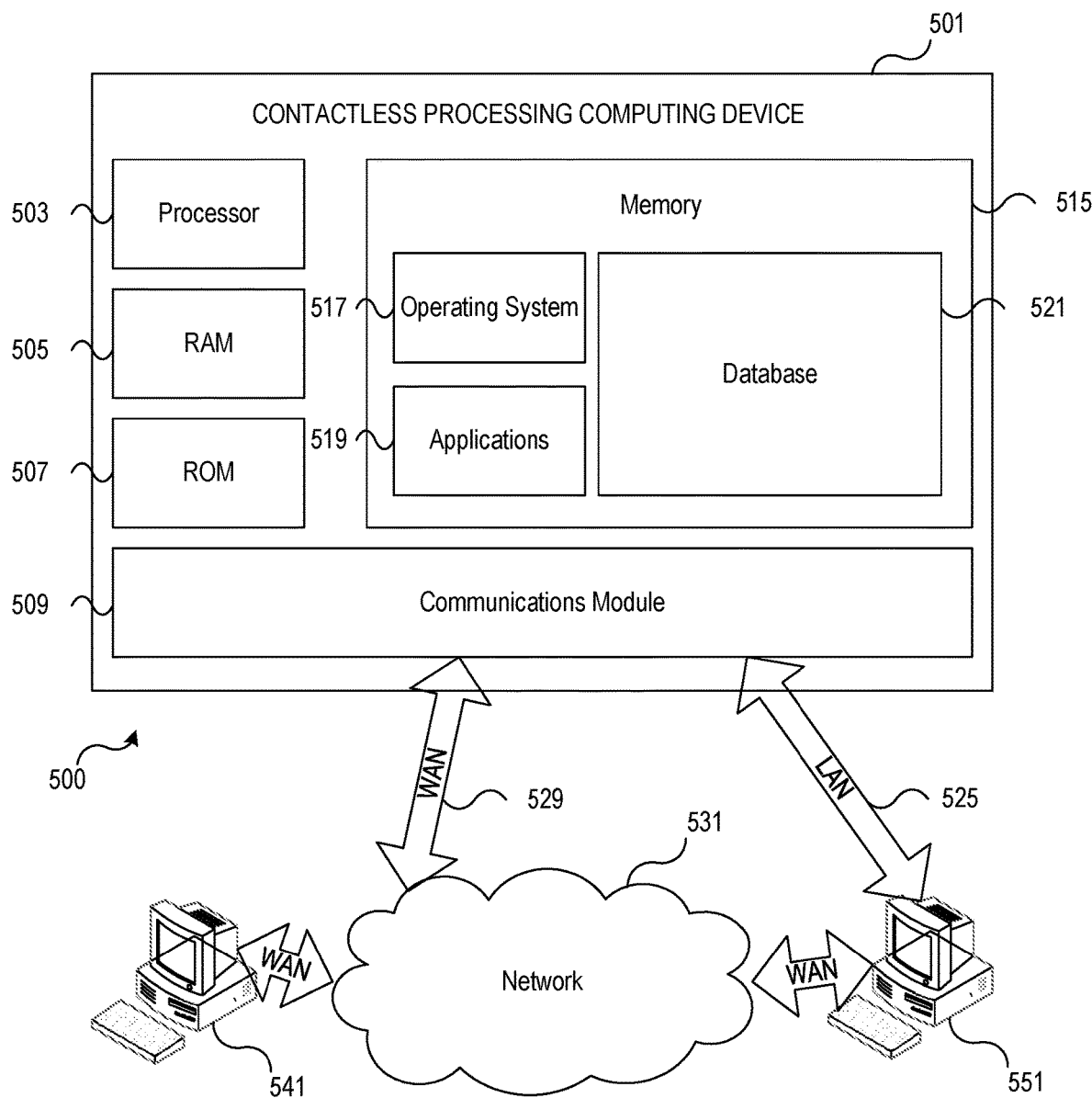
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include contactless processing computing device 501 having processor 503 for controlling overall operation of contactless processing computing device 501 and its associated components, including Random Access Memory (RAM) 505, Read-Only Memory (ROM) 507, communications module 509, and memory 515. Contactless processing computing device 501 may include a variety of computer readable media. Computer readable media may be any available media that may be accessed by contactless processing computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by contactless processing computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on contactless processing computing device 501. Such a processor may execute computer-executable instructions stored on a computer-readable medium.

Software may be stored within memory 515 and/or storage to provide instructions to processor 503 for enabling contactless processing computing device 501 to perform various functions as discussed herein. For example, memory 515 may store software used by contactless processing computing device 501, such as operating system 517, application programs 519, and associated database 521. Also, some or all of the computer executable instructions for contactless processing computing device 501 may be embodied in hardware or firmware. Although not shown, RAM 505 may include one or more applications representing the application data stored in RAM 505 while contactless processing computing device 501 is on and corresponding software applications (e.g., software tasks) are running on contactless processing computing device 501.

Communications module 509 may include a microphone, keypad, touch screen, and/or stylus through which a user of contactless processing computing device 501 may provide input, and may also include one or more of a speaker for providing audio output and a video display device for providing textual, audiovisual and/or graphical output. Computing system environment 500 may also include optical scanners (not shown).

Contactless processing computing device 501 may operate in a networked environment supporting connections to one or more remote computing devices, such as computing devices 541 and 551. Computing devices 541 and 551 may be personal computing devices or servers that include any or all of the elements described above relative to contactless processing computing device 501.

The network connections depicted in FIG. 5 may include Local Area Network (LAN) 525 and Wide Area Network (WAN) 529, as well as other networks. When used in a LAN networking environment, contactless processing computing device 501 may be connected to LAN 525 through a network interface or adapter in communications module 509. When used in a WAN networking environment, contactless processing computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
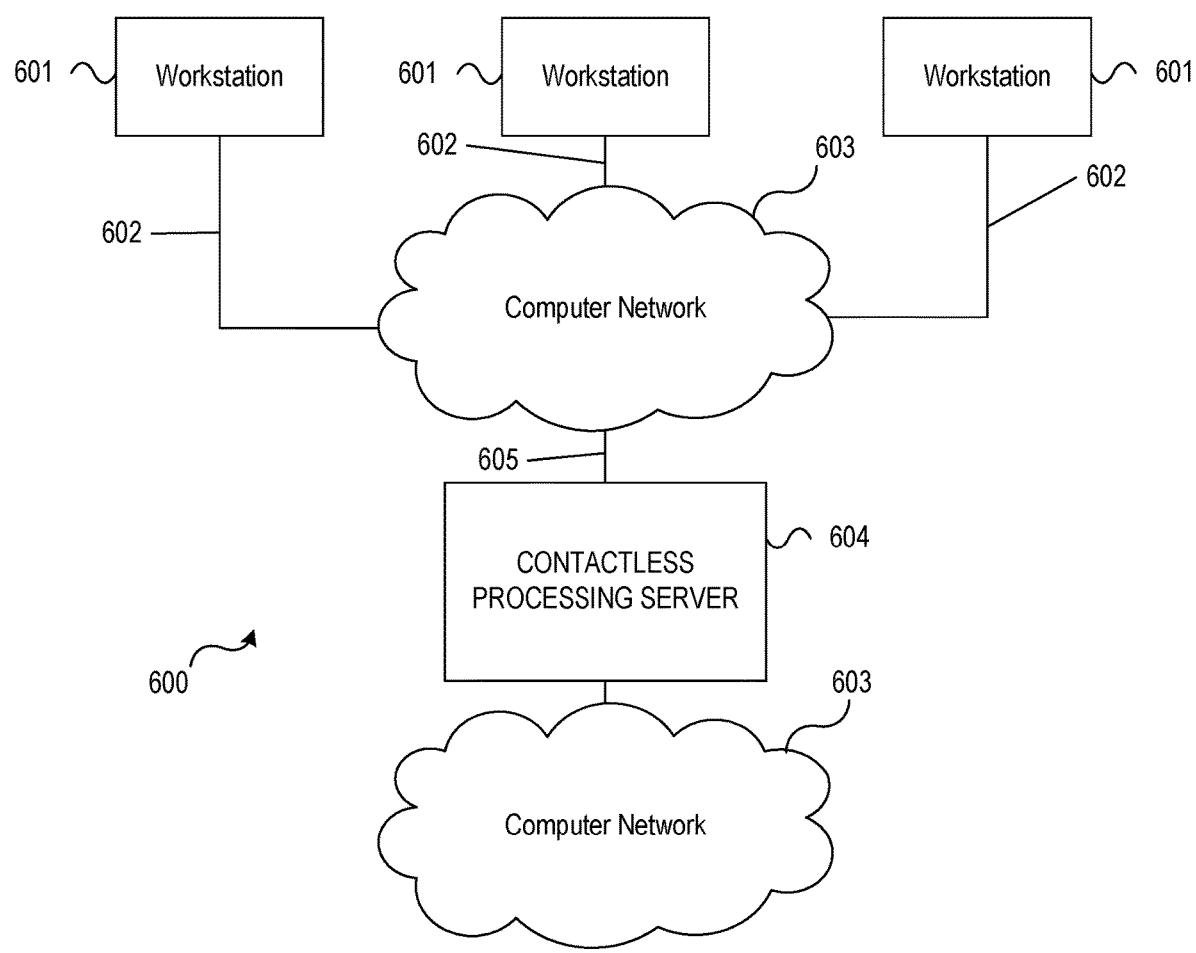
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to contactless processing server 604. In system 600, contactless processing server 604 may be a server, processor, computer, or data processing device, or combination of the same, configured to perform the functions and/or processes described herein. Server 604 may be used to receive a request to access functionality, receive authentication information, authenticate a user, generate and transmit interactive user interfaces, receive and process user input received via a user computing device, execute or cause to execute functionality of a self-service kiosk, or the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and contactless processing server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
a self-service kiosk, including:
at least a first processor;
a communication interface communicatively coupled to the at least a first processor; and
a memory storing computer-readable instructions that, when executed by the at least a first processor, cause the self-service kiosk to:
receive a request to access functionality, the request to access functionality including detection of a signal associated with a pre-registered user computing device detected via near-field communication;
responsive to detecting the signal associated with the pre-registered user computing device, establish a wireless connection between the pre-registered user computing device and the self-service kiosk;
authenticate a user in response to receiving the request to access functionality, authenticating the user including transmitting a request for authentication data to the pre-registered user computing device;
generate a first interactive user interface including a plurality of selectable options;
display the generated first interactive user interface on a display of the self-service kiosk; and
the pre-registered user computing device including:
at least a second processor;
a second communication interface communicatively coupled to the at least a second processor; and
a second memory storing computer-readable instructions that, when executed by the at least a second processor, cause the pre-registered user computing device to:
capture, using an image capture device of the pre-registered user computing device, an image of the displayed first interactive user interface;
display, on a touch sensitive display of the pre-registered user computing device, the captured image of the displayed first interactive user interface;
receive, via the touch sensitive display, user input in a region of the touch sensitive display corresponding to one option of the plurality of selectable options displayed in the captured image and displayed on the touch sensitive display of the pre-registered user computing device;

transmit the received user input to the self-service kiosk;

the self-service kiosk further including instructions that, when executed, cause the self-service kiosk to:

receive the transmitted user input; and execute a function associated with the one option associated with the user input.

2. The system of claim 1, wherein the pre-registered user computing device is a mobile computing device.

3. The system of claim 1, wherein authenticating the user further includes retrieving pre-stored authentication data of the user and comparing the pre-stored authentication data to data received from the user.

4. The system of claim 3, wherein the pre-stored authentication data is pre-stored during a registration process.

5. The system of claim 1, wherein executing the function associated with the one option associated with the user input includes generating a second interactive user interface, displaying the second interactive user interface on the display of the self-service kiosk.

6. The system of claim 1, wherein executing the function associated with the one option associated with the user input includes dispensing funds from the self-service kiosk.

7. A method, comprising:

receiving, by a self-service kiosk having at least a first processor and memory, a request to access functionality, the request to access functionality including detection of a signal associated with a pre-registered user computing device detected via near-field communication;

responsive to detecting the signal associated with the pre-registered user computing device, establish a wireless connection between the pre-registered user computing device and the self-service kiosk;

authenticating, by the at least a first processor, a user in response to receiving the request to access functionality, authenticating the user including transmitting a request for authentication data to the pre-registered user computing device;

generating, by the at least a first processor, a first interactive user interface including a plurality of selectable options;

displaying, by the at least the first processor, the generated first interactive user interface on a display of the self-service kiosk;

capturing, via an image capture device of the pre-registered user computing device having at least a second processor and memory, an image of the displayed first interactive user interface;

displaying, by the at least a second processor and on a touch sensitive display of the pre-registered user computing device, the captured image of the displayed first interactive user interface;

receiving, by the at least a second processor and via the touch sensitive display, user input in a region of the touch sensitive display corresponding to one option of the plurality of selectable options displayed in the captured image and displayed on the touch sensitive display of the pre-registered user computing device;

transmitting, by the at least a second processor, the received user input to the self-service kiosk;

receiving, by the at least a first processor, the transmitted user input; and executing, by the at least a first processor, a function of the self-service kiosk associated with the one option associated with the user input.

8. The method of claim 7, wherein the pre-registered user computing device is a mobile computing device.

9. The method of claim 7, wherein authenticating the user further includes retrieving pre-stored authentication data of the user and comparing the pre-stored authentication data to data received from the user.

10. The method of claim 9, wherein the pre-stored authentication data is pre-stored during a registration process.

11. The method of claim 7, wherein executing the function of the self-service kiosk associated with the one option associated with the user input includes generating a second interactive user interface, displaying the second interactive user interface on the display of the self-service kiosk.

12. The method of claim 7, wherein executing the function of the self-service kiosk associated with the one option associated with the user input includes dispensing funds from the self-service kiosk.

13. One or more non-transitory computer-readable media storing instructions that, when executed by a computing platform comprising at least one processor, memory, and a communication interface, cause the computing platform to:

receive a request to access functionality, the request to access functionality including detection of a signal associated with a pre-registered user computing device detected via near-field communication;

responsive to detecting the signal associated with the pre-registered user computing device, establish a wireless connection between the pre-registered user computing device and a self-service kiosk associated with the computing platform;

authenticate a user in response to receiving the request to access functionality, authenticating the user including transmitting a request for authentication data to the pre-registered user computing device;

generate a first interactive user interface including a plurality of selectable options;

display the generated first interactive user interface on a display of the computing platform;

receive, from the pre-registered user computing device, user input in a region of a touch sensitive display of the pre-registered user computing device corresponding to one option of a plurality of selectable options displayed on the touch sensitive display via an image of the generated first interactive user interface captured via an image capture device of the pre-registered user computing device; and execute a function associated with the one option associated with the user input.

14. The one or more non-transitory computer-readable media of claim 13, wherein the pre-registered user computing device is a mobile computing device.

15. The one or more non-transitory computer-readable media of claim 13, wherein authenticating the user further includes retrieving pre-stored authentication data of the user and comparing the pre-stored authentication data to data received from the user.

16. The one or more non-transitory computer-readable media of claim 15, wherein the pre-stored authentication data is pre-stored during a registration process.

17. The one or more non-transitory computer-readable media of claim 13, wherein executing the function associated with the one option associated with the user input includes generating a second interactive user interface, displaying the second interactive user interface on the display of the computing platform.

18. The one or more non-transitory computer-readable media of claim 13, wherein executing the function associated with the one option associated with the user input includes dispensing funds from the self-service kiosk associated with the computing platform.

* * * * *